Figure 1:
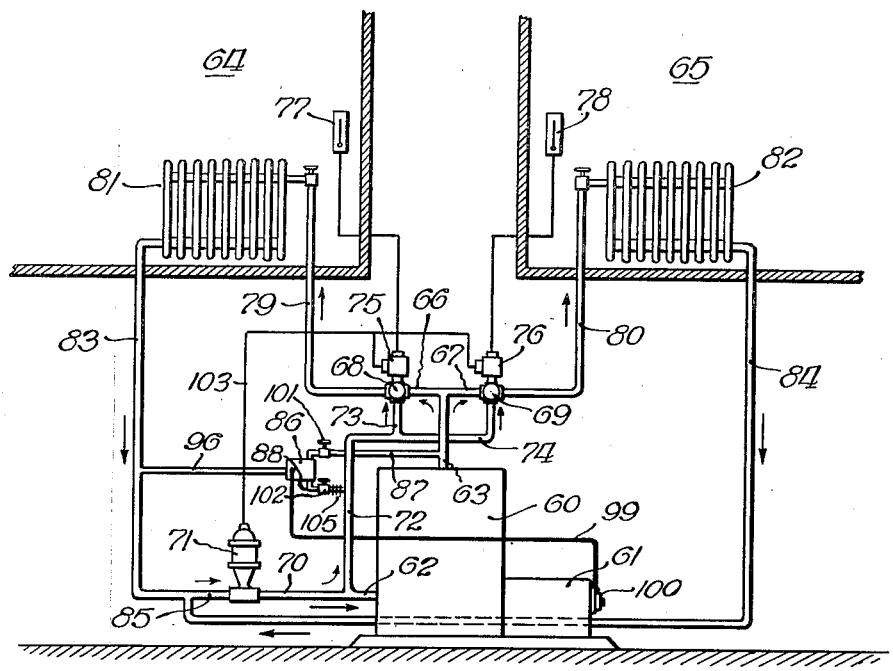

July 3, 1951

R. A. LINGEN ET AL 2,559,253

HEATING SYSTEM CONTROLLER

Filed March 8, 1946

INVENTORS:
Ralph A. Lingen
Lloyd E. Cross
By Charles K Woodin
Agent.

Patented July 3, 1951

2,559,253

UNITED STATES PATENT OFFICE 2,559,253

HEATING SYSTEM CONTROLLER

Ralph A. Lingen and Lloyd E. Cross,
Milwaukee, Wis.

Application March 8, 1946, Serial No. 652,939

5 Claims. (Cl. 237—8)

This invention relates to a controller designed primarily for use in connection with a heating, cooling or air conditioning system. More specifically such controller is used in conjunction with the hot and cold water delivery ducts which supply a mixture of hot and cold water to a plurality of ducts leading to individual rooms or spaces, and which controller is sensitive to the temperature of the by-passed air flowing between the ducts due to the pressure differentials existing at different periods of operation within the hot and cold water ducts. By such sensitivity, this controller is connected with the appliance or any other means that provides a source of heat or cooling and is capable through suitably connected means for regulating a modulating control at the points or location of the appliance or source of heat or cooling as the case may be.

The controller disclosed and described in the present case relates to a structure and subject matter that is submitted as a continuation-in-part of our Patent No. 2,440,052 relating to an averaging controller. For additional information, reference may be had to this patent to amplify the subject matter providing the concept of the present invention.

One of the main objects of the present invention is to provide a controller for a heating system which is connected with hot and cold fluid conduits, and which is arranged for highly sensitive reaction to temperature changes in that this controller is directly disposed in by-passed fluid flowing because of a pressure differential between such hot and cold fluid conduits, and to directly connect this controlling instrument with a source of heat or cooling in such a manner as to produce a modulating control at such point. In this manner, the temperature of the fluid delivered in the warm or hot fluid conduit is maintained at such a temperature level that when mixed with a given quantity of fluid at the temperature of the fluid delivered in the cool fluid conduit substantially provides a definite resultant fluid mixture at room controlled fluid mixing units to provide a heating system which is at all times substantially tuned, so to speak, to efficiently provide fluid of a predetermined temperature directly to the rooms in full accord and direct ratio with the particular demands of such individual rooms of the entire building being served by the heating system.

It has been shown through tests that the controller of the present design provided closer control or regulation in regulating an appliance in installations where stoker or oil burner units are used particularly in view of the fact that this controller tends to anticipate requirements due to its greater sensitivity to changes to the temperature of the water in the warm and cool water ducts of the system being regulated by such controller. The immediate design of this controller enhances its responsiveness to the changes occurring in the heating system, improving the instrument for use in many cases over the averaging controller shown and described in our copending application of which the present case is a continuation-in-part.

All other objects and advantages relating to the adaptation and particular construction of the present controller shall hereinafter appear in the following detailed description of the same having reference to the accompanying drawings disclosing a preferred embodiment thereof.

Figure 2:
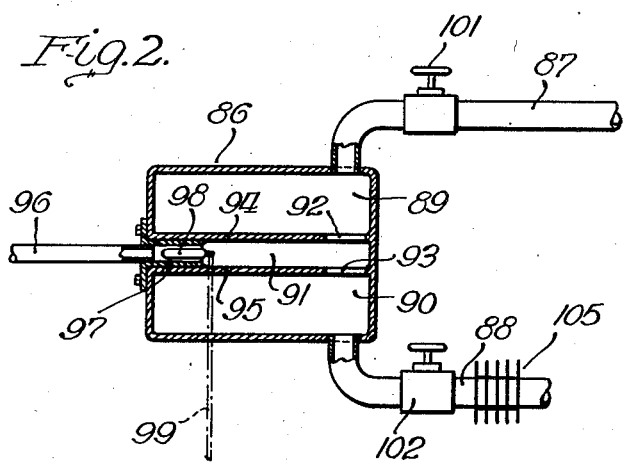

In the drawings:

Fig. 1 is a suggested diagrammatic layout of a hot water heating system incorporating the controller of the present invention arranged for on and off operation of a heating plant; and Fig. 2 is an enlarged cross sectional view of the controller to illustrate details of construction thereof as used in the system illustrated in Fig. 5.

In referring to the drawing, there is disclosed in Fig. 1 a hot water heating system incorporating a controller to regulate the flow of hot and cold water much the same as in the patented construction wherein the thermostatic unit operates the burner of a hot water heater. Fig. 1 shows a heater 60 receiving its heat from an oil burner 61, the hot water heater 60 having an inlet cool water line 62 and an outlet hot water line 63. This installation typifies the heating of two spaces or rooms such as 64 and 65, and the hot water line 63 is therefore divided into the hot water lines 66 and 67 which lead to and pass through the three-way mixing valves 68 and 69 respectively.

The cool water line 70 leads from a combination motor pump unit 71 and connects with the cool water line 62 which enters the heater 60 and also with the cool water riser 72 which divides into the cool water lines 73 and 74 that also lead to the three-way mixing valves 68 and 69, respectively.

Suitable operating units 75 and 76 which may be similar to those disclosed in our Patent No. 2,440,052 are connected with the mixing valves 68 and 69 respectively and are remotely and independently operated by means of the thermostatic units 77 and 78 conveniently located in the rooms or spaces 64 and 65 as shown in Fig. 1. Therefore, the control mechanisms 75 and 76 are directly responsive to the room temperatures to set the mixing elements in the valves 68 and 69 in a definite predetermined position to deliver the proper temperature of water through the lines 79 and 80 which lead from these valves to the room radiators 81 and 82. Return lines 83 and 84 are connected to the intake line 85 of the pump 71 from which the water is again circulated to the hot water heater 60 and to the cool water riser 72.

The controller in this system comprises a water or fluid manifold 86 having a fluid conduit 87 connected with the hot water riser 63 and a cool water fluid connection 88 connected with the cool water riser 72. In Fig. 2, the manifold 86 is substantially constructed in the same way as the manifold for the hot air system illustrated in our Patent No. 2,440,052. The manifold 86 has the two oppositely disposed chambers 89 and 90 for communication with the conduits 87 and 88 respectively and such chambers are divided by a relatively narrow and more or less constricted chamber 91 which is actually common to both of the former. Openings 92 and 93 are formed in the partition walls 94 and 95 while a suitable bleed line 96 connects the chamber 91 with the return cool water system which, in this case, is the return cool water line 83.

A suitable fitting 97 receives the controller end of the bleed line 96 and also provides a sleeve unit within the common chamber 91 to receive the thermal bulb 98 and functions to constrict the flow of fluid from the chamber 91 to surround and pass over the thermal bulb to obtain a better average temperature reaction to make the thermal bulb 98 directly responsive to the mixed fluid temperature by-pass from either of the chambers 89 and 90 depending on the flow of the fluid through the lines 87 and 88 leading to the manifold 86.

The thermal bulb 98 is suitably connected by means of the conduit 99 which extends to a suitable thermostatically operated electrical switch 100 that is directly responsive to the temperature reactions of the thermal bulb 98 in the controller which functions to either turn on or shut off the oil burner unit 61 supplying heat to the hot water heater 60. Also, the manifold intake and outlet lines 87 and 88 are provided with valves 101 and 102 to provide a regulatory means for the flow of fluid through either of these lines to produce a balanced system in the same manner as the damper controls are regulated in our patent.

The operation of the controller herein disclosed is similar to the controller disclosed in our patent, the only difference being that the pressure differential is created in liquids in the present system whereas the patented construction relates to air regulation. Thus, the thermostats 77 and 78 directly operate the mixing valves 68 and 69 by means of the regulating mechanisms 75 and 76 to provide the proper fluid mixture referring to the cool and hot water fluids, such regulatory mechanisms 75 and 76 also responding individually to operate the motor pump unit 71 by means of the circuit 103, while the entire heating of the system as provided by the burner 61 is directly controlled by the controller 86 which is sensitive to the mixed water flow from the hot and cold water lines to turn the heater 60 and burner 61 on and off according to the direct demands of the rooms 64 and 65 as described.

In the hot water system it may be advisable to add a heat dissipating means like a finned tube 105 for attachment to the cool water manifold line 88. In mild weather the return line temperatures may be relatively high in comparison with the temperature of the hot water in the riser from the heater. The manifold is responsive to the temperature of the hot water line 87 that is connected with the hot water feed line. With the addition of a further means like 105, the temperature of the cool water manifold line 88 is maintained below a possible low mild weather temperature of the water in the hot water feed line so as to not disturb the proper functioning of the manifold controller 86.

While this description with reference to Fig. 1 has been directed to a hot water system incorporating conventional radiators, the same system may use other means of heat radiation. The heat may be dissipated through the use of piping imbedded in the floor and/or walls of a room and the controller described is fully as applicable to such systems as well as the one shown in Fig. 1.

It is to be understood that modifications and changes are contemplated in a controller herein disclosed and described and that other applications of similar or analogous natures are also possible in addition to the particular installations shown as a matter of preference in the accompanying drawings. Therefore, the invention is not to be limited to the exact form, arrangement, or combination of parts shown and described, but the general arrangement and substitution of equivalents shall be determined by the breath and scope of the subject matter submitted herewith in the appended claims directed to the invention.

What we claim is:

1. In a hot water heating system, a hot water heater, a hot and cold water mixing valve, a radiation unit arranged for heating a predetermined space, a hot water pipe extending from said heater to said mixing valve, a source of cold water including a pump having a flow connection with said heater and a cold water pipe connection with said mixing valve, a hot mixed water line leading from said mixing valve to said radiation unit and a cold water return line leading from said radiation unit to the cold water pump, thermostatically operable means responsive to the temperature in the space being heated for regulating said mixing valve and said motor pump, a burner for said heater having an operating switch, and a controller having a thermostat connected to operate said burner switch, said controller having flow connections with the hot and cold water pipes arranged to pass mixed hot and cold water through a restricted zone in said controller, said thermostat being positioned within said restricted zone, and a bleed connection leading from said restricted zone of the controller to the cold water return pipe.

2. In a hot water heating system, a hot water tank, a burner for heating the tank, an operating switch for controlling said burner, a hot water supply pipe leading from said tank, a hot and cold water mixing valve connected with said hot water pipe, a mixed water line extending from said mixing valve to a radiation unit arranged to heat a predetermined space, thermostatic means responsive to the temperature in said space for controlling said mixing valve, means including a motor pump for supplying cold water through pipes to said tank and to said mixing valve, a cold water return pipe leading from said radiation unit to the motor pump, and a controller comprising a restricted mixing chamber with continuous flow connections leading from the hot and cold water supply pipes, and a thermostat connected to operate said burner switch, said thermostat being disposed within the restricted chamber and being operably responsive to the resultant temperature of the combined hot and cold water flowing through said chamber.

3. In a hot water heating system, a hot water heater, a burner for heating the same, a radiator to heat a given space, a hot water pipe leading from the heater to the radiator, said pipe having a hot and cold water mixing valve, means for operating said valve including a thermostat in the space being heated by said radiator, a source of cold water having a motor pump with a flow connection to said heater and a flow connection to said mixing valve, a cold water return pipe leading from said radiator to said pump, said thermostat having operating means connected with said pump, a switch for controlling said burner, and a controller comprising a thermostat operably connected with said switch, and a constricted mixed fluid conducting chamber for housing said thermostat to operably respond to the temperature of the fluids passing through said chamber, said chamber being connected to receive fluid flow from the hot water pipe and from the cold water flow connection to the mixing valve.

4. In a hot water heating system, a hot water tank, a burner for heating said tank, a switch for controlling said burner, a radiator to heat a given space, a hot water pipe connecting said tank and radiator, said pipe having an intermediate hot and cold water mixing valve, a source of cold water having a pump with an inlet pipe connected to said tank, a cold water pipe extending from said inlet pipe to said mixing valve, and a return water line leading from said radiator to said pump, operating means for adjusting said mixing valve including a thermostat positioned in the space being heated by said radiator, said operating means including a connection to said pump for controlling the latter, and a controller comprising a mixing manifold having a constricted fluid conducting chamber therein, a thermostat housed in said chamber and operably connected to actuate the burner switch, fluid flow conduits connecting the hot and cold water pipes respectively with said manifold, and a bleeder line leading from the constricted fluid conducting chamber to the cold water source.

5. In a hot water heating system, a hot water tank, a burner for heating the tank and having an operating switch, a radiator to heat a given space, a hot water pipe extending from the tank to the radiator, a hot and cold water mixing valve in said hot water pipe, a source of cold water supply having a pump with an inlet pipe extending to said tank, a cold water pipe extending from said inlet pipe to said mixing valve, and a return water line leading from said radiator to said pump, operating means for said mixing valve including a thermostat positioned in the space being heated by the radiator, and a controller comprising a fluid conducting and mixing manifold having flow connections with the aforesaid hot and cold water pipes, and a thermostat in said manifold operatively responsive to the temperature of the mixed fluids in said manifold, said thermostat being operatively connected to actuate said burner switch under predetermined temperature conditions in the manifold fluid surrounding said thermostat.

RALPH A. LINGEN.
LLOYD E. CROSS.

REFERENCES CITED

The following references are of record in the file of this patent:

UNITED STATES PATENTS

| Number | Name | Date |
|---|---|---|
| 1,871,093 | Stem | Aug. 9, 1932 |
| 1,981,679 | Stem | Nov. 20, 1934 |
| 2,067,629 | Flagg | Jan. 12, 1937 |
| 2,188,775 | Locke | Jan. 30, 1940 |
| 2,235,692 | Timmis | Mar. 18, 1941 |
| 2,440,052 | Lingen et al. | Apr. 20, 1948 |